US008750822B2

(12) United States Patent
Daniel

(10) Patent No.: US 8,750,822 B2
(45) Date of Patent: Jun. 10, 2014

(54) EMERGENCY SERVICES BASED ON LOCATION INFORMATION STATISTICS

(75) Inventor: Patrick Daniel, Lipsheim (FR)

(73) Assignee: Alcatel Lucent, Paris (FR)

( * ) Notice: Subject to any disclaimer, the term of this patent is extended or adjusted under 35 U.S.C. 154(b) by 1492 days.

(21) Appl. No.: 11/747,218

(22) Filed: May 10, 2007

(65) Prior Publication Data

US 2007/0279218 A1 Dec. 6, 2007

(30) Foreign Application Priority Data

May 31, 2006 (EP) ..................................... 06300537

(51) Int. Cl.
*H04M 11/04* (2006.01)
*H04W 24/00* (2009.01)

(52) U.S. Cl.
USPC ................... 455/404.2; 455/414.1; 455/456.1

(58) Field of Classification Search
USPC ............ 455/404.1–2, 414.1–2, 461, 456.1–6; 379/33, 38–51; 340/539.13
See application file for complete search history.

(56) References Cited

U.S. PATENT DOCUMENTS

| 6,104,931 A * | 8/2000 | Havinis et al. ............. 455/456.5 |
| 2003/0134648 A1* | 7/2003 | Reed et al. .................... 455/456 |
| 2004/0239530 A1* | 12/2004 | Izumi et al. ................... 340/990 |
| 2005/0001720 A1* | 1/2005 | Mason et al. ............ 340/539.13 |
| 2005/0085257 A1* | 4/2005 | Laird et al. ................. 455/550.1 |

* cited by examiner

*Primary Examiner* — George Eng
*Assistant Examiner* — Joseph Dean, Jr.
(74) *Attorney, Agent, or Firm* — Fay Sharpe LLP

(57) ABSTRACT

A system and a method for tracking users in a closed environment even in the case the available system for locating a user is an idle state is based on the use of a system which comprises a database for storing the location of the users measured at regular time interval within that closed environment. Such a system comprises further a processor for estimating the possible location of a registered user at any time according to the different stored measured location. Such estimation can be advantageously a statistical analysis corresponding to some daily geographical footprint of the registered user. The system comprises also a decision unit to provide the possible location of the registered user estimated for a specific time when required in the case the location measurement system is in an idle state. In that case, the estimated possible location can be forwarded to some PSAP.

12 Claims, 1 Drawing Sheet

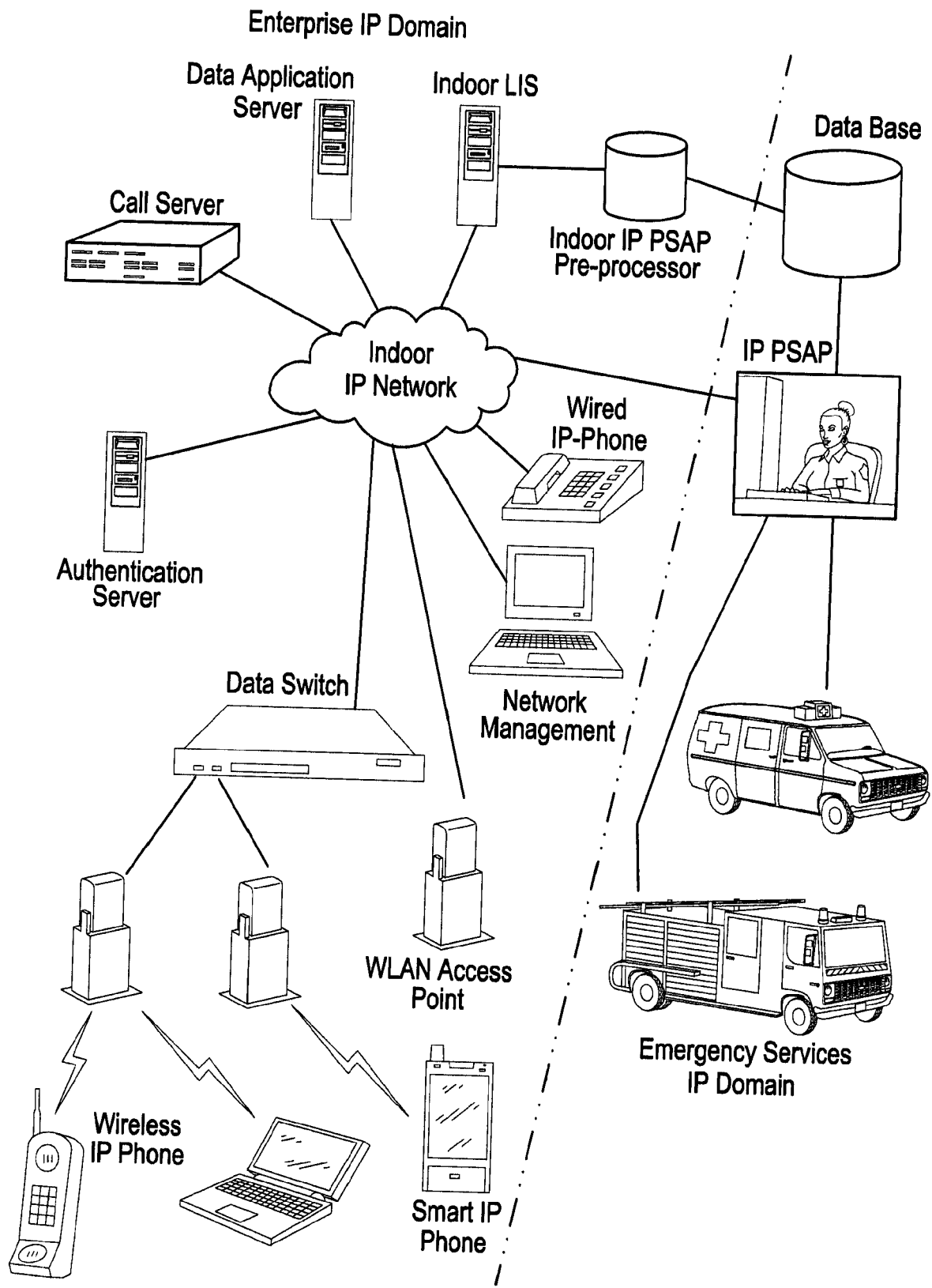

EMERGENCY SERVICES BASED ON LOCATION INFORMATION STATISTICS

TECHNICAL FIELD

The invention is based on a priority application EP 06 300 537.5 which is hereby incorporated by reference.

The present invention relates to a system for tracking users in a closed environment. Such a system comprises a database for registering different possible users within that closed environment. It comprises further a location measurement system for locating the users within that closed environment. The present invention is also related to a method for tracking the users in a closed environment while the method comprises the steps to register different possible users within that closed environment and to measure at regular time interval the location of the users within that closed environment using some location measurement system. The present invention is further related to a computer readable medium comprising codes to be executed on a device for tracking users in a closed environment.

BACKGROUND OF THE INVENTION

In U.S. Pat. No. 6,748,224 is described a local positioning system using the radio propagation parameters in a code division multiple access (CDMA) forward link or time division multiple access (TDMA) reverse link to establish a mobile station's position. The mobile station receives pilot channel signals from at least three distinct base stations and records the pseudo-random noise chip offset of the pilot channel signals. This is enough to perform some classical triangulation based on time difference of arrival and requiring no additional signal detection capabilities. Base stations send out pilot channel signals that arrive at a mobile station with a particular phase and at least a predetermined minimum strengths. The mobile station reports back the visible pilot channel signals, their phases and signal strength to the LPS which uses a location non-linear system to estimate the mobile location. Such a LPS can also solve the E911-E112 mobile location problem for wireless CDMA system by determining the position of a person in distress that has a digital cellular phone.

In U.S. Pat. No. 6,385,458 is described a method, a computer program and systems that implement a location service in a mobile communications network to generate a location estimate for a terminal device associated with a user. The proposed method takes a location request, and, with a precision that is dependent on an assigned priority level, estimates the location of a mobile phone.

The two above cited prior arts are two typical prior arts among other dealing with the location of a end user in case of a E911-E112 emergency call. Both prior arts are based on a location measurement system which must be in a correct running mode to be able to forward the required location information. In the case such a location measurement system is in an idle state, the required information cannot be collected which cause serious problem in case of an emergency call. This is a quite hot topic for telecommunications network built on Internet Protocol IP particularly for a premise IP network (indoor or closed network). In that case, all the telecommunications are performed using wired IP terminals or wireless IP terminals. A location of a user inside such indoor IP network can be provided using the access points of the corresponding wireless network infrastructure spread over the closed environment usually matching the campus of a firm or specific organization. In that case, the wireless network infrastructure used for providing telecommunication facilities in a wireless mode through out the campus are also used for locating a user of such an IP terminal. The location can be based on classical triangulation methods or any other location procedure using the access points. Such wireless network infrastructure can however be out of order at least for some finite time interval. Consequently, users inside the environment covered by the wireless network infrastructure and equipped with wireless IP terminals cannot call outside anymore and cannot be located for help. Such interruptions are not so speculative since some wireless network infrastructure are powered such that the access points are powered using the already existing powering facility. And in case of a general powering break out, the wireless network infrastructure will be then in an idle state rendering impossible any location procedure of a user inside the environment covered by that wireless network infrastructure. Such situation is particularly unsatisfactory in case an emergency call is launched using e.g. some IP wired telecommunications terminal. Even more, in the situation of fire, there is no guaranty that the equipment will not be destroyed rendering the use of such telecommunications terminal simply impossible.

SUMMARY OF THE INVENTION

The object of the present invention is to provide a system and a method for tracking users in a closed environment even in the case the available system for locating an user is an idle state.

This object is achieved in accordance with the invention by using a system for tracking users which comprises a database for storing the location of the users measured at regular time interval within that closed environment. Such a system comprises further a processor for estimating the possible location of a registered user at any time according to the different stored measured location. Such estimation can be advantageously a statistical analysis corresponding to some daily geographical footprint of the registered user. The system according to the invention comprises further a decision unit to provide the possible location of the registered user estimated for a specific time when required in the case the location measurement system is in an idle state. This is typically the case when the location measurement system is a wireless network infrastructure spread over the closed environment i.e. when the campus of the premise or the organization is out of order.

In an advantageous embodiment according to the invention such estimated possible location is forward to some Public Safety Answering Point (PSAP). This would be particularly the case when a user initiates an emergency call just in the situation the location measurement system is in an idle state or 'out of order'.

In an alternative embodiment according to the invention, the estimated possible location for a specific time of all the registered users are concatenated allowing to obtain a picture of the possibly required resources particularly critical in an emergency situation.

The invention further relates to a method for tracking users in a closed environment while the method comprises the steps to register different possible users to be tracked within that closed environment and to measure at regular time interval the location of the users within that closed environment using some location measurement system. The method according to the invention comprises the further steps to store the different location measurements of the registered users versus the time the measurement is performed. And usually in a later state possibly in a batch mode, an estimation procedure is started to obtain a possible location of the registered users at any time within the closed environment using all the stored measured location. The method comprises also the step to provide the possible location of the registered user for a specific time when this possible location is required and in the case the used location measurement system is in an idle state. Advantageously, the estimation step of the possible location of the registered users is performed at regular time using the newly stored location measurements of the users. Such estimation procedure may require some processing capabilities which can be minimize by performing that estimation step in a batch mode processing.

The invention relates also to a computer readable medium comprising codes to be executed on a terminal for tracking users in a closed environment. Some of the codes when executed perform an estimation of the possible location of registered users at any time within closed environment using a database with stored location measurement of the users performed at a regular time interval within that closed environment. The codes comprise also codes which are executed when the location of the user is required while forwarding the resulting estimation to the application requiring the location of the user. Such computer readable medium can be part of a server from a network in the closed environment. It can also be spread over several different servers if the chosen network architecture requires it. Advantageously, the database environment is located in some secure place e.g. outside the network or duplicated or even in some kind of safe so to be available also in a major scenario of a network collapse due to some fire or other different destructive reason.

Advantageous developments of the invention are described in the dependent claims, the following description and the drawings.

BRIEF DESCRIPTION OF THE DRAWINGS

An exemplary embodiment of the invention will now be explained further with the reference to the attached drawings in which:

FIG. 1 is an overview of an indoor network together with connections to some public safety answering point.

DETAILED DESCRIPTION OF PREFERRED EMBODIMENTS

Precise location is a major issue in case of emergency services for an end-user handling a wireless IP terminal in a indoor environment. The location procedure is particularly adapted when the indoor wireless network infrastructure possibly but not necessarily a WLAN or some network based on WIMAX, Bluetooth or RFID technology is soon out of order and consequently employees equipped with such wireless IP terminals can no more call outside and be located as now required for a E911-E112 emergency service. The best solution today using such wireless network is obtained by continuous tracking the users and then operates the emergency service on the last sent geographical position. But such a solution is almost of no use when the location system is in an idle state or out of order during a time interval bigger than a minute since the user inside the indoor or closed environment could have moved in the meantime. In that case, the last position corresponds to a false information for the rescue party.

In FIG. 1 is shown an overview of a typical indoor IP network. It comprises a call server which usually corresponds to the IP-PBX for managing all the usual telecommunications tasks indoor as well as to or from the outside world. The indoor or enterprise network comprises further a data application server, an authentication server, some network management. A plurality of wired IP terminals are spread over the entire network usually at least one per workplace. Parallel to the wired IP terminals are spread wireless network infrastructure access points to cover the enterprise environment (closed environment). Some of the access points can be directly connected to some data switch. The coverage of the closed environment by the different access points permits the use of wireless terminals like a IP wireless phone or laptop with a wireless network infrastructure access or a smart IP phone or any other kind of wireless terminals.

Such indoor IP network is directly connected to some IP public safety answering point (PSAP) usually outside the closed environment. Such IP PSAP is then directly connected to some emergency services like a fire brigade or department, any hospitals or the like.

The enterprise IP domain or indoor IP network as sown on FIG. 1 comprises also a Indoor Location Information Server (LIS) which is part of the location measurement system. Such location information server is used in connection with the different access points of the wireless network infrastructure to locate the different users (geographical presence measurement) when present inside the closed environment covered by the indoor IP network. The LIS can be connected to some indoor IP PSAP pre-processor which is itself connected to some database. Latter can be directly connected to the IP PSAP.

When implementing an embodiment according to the invention, some further database is required for storing the location of the users measured at regular time interval within that closed environment. That database can be part of the indoor LIS or some other server from the enterprise IP domain.

In the case the wireless network infrastructure infrastructure as shown on FIG. 1 is out of order (in an idle state) the users (e.g. employees of the premise covered by the indoor IP network) equipped with wireless IP terminals can no more call outside and be located for help. Such idle state could be directly the consequence of for example a fire affecting e.g. the powering equipment. Possibly, some person like security guard would still be able to activate a call E911-E112 for emergency service. Such a call can then activate the steps within the method according to the invention such that the "indoor IP PSAP pre-processor" with inputs such as "E911-E112 launched call" combined to "wireless network infrastructure out of order" and "hit geographical area is P3" could automatically pushed towards the nearest IP PSAP. P3 is here an example of the identification of the concerned geographical footprint assistance data with a good probability to reach employees in distress in a short time.

When implementing an embodiment according to the invention then all previous indoor locations are regularly stored to be analyzed to build some statistic giving a daily geographical footprint of each registered user i.e. employees of the premise covered by the network. All the stored location measurement will then be a major step in assistance data. And the analyzed as well as the refining of the footprint requires no real-time task since preferably performed in batch mode processing. The obtained data could be one of the multimedia components sent to the next IP PSAP generation in order to strongly increase the probability to locate people in distress (geographical information system application). Usually for most of the employees, this footprint is quite stable—80% department area, 10% staff canteen, 10% miscellaneous. Furthermore, in case of a collective emergency call, all people footprints could be if necessary concatenated giving instantaneously a right picture about emergency resources to dispatch on the complete scene and how to optimize them e.g. large employees density in some specific areas for example. Such assistance data are processed by the "indoor LIS" and regularly pushed to the "indoor IP PSAP pre-processor" ready for external potential use.

Advantageously, by implementing an embodiment according to the invention even if indoor wireless infrastructure is in an idle state or out of order, IP PSAP receives a location information with relatively good statistics about employees' presence (location) in the premise and possibly the emergency effort to provide. An embodiment according to the invention could solve IP emergency services coverage which start to be mandatory in the short time. And all ideas like the present one concerning rich information delivery to next generation IP PSAP are key points.

The invention claimed is:

1. A system for tracking users in a closed environment, the system comprising:
   a location measurement system operative to locate registered users within the closed environment;
   a database storing locations of the users within the closed environment measured at different times versus the time the measurement is performed; and
   a processor operative to estimate a possible location of a registered user at any time according to the measured locations stored in the database for a specific time using a statistical analysis corresponding to a daily geographical footprint of the registered user;
   wherein the location measurement system includes an indoor location information server operatively coupled with the wireless network infrastructure, and wherein the indoor location information server receives an activated call for emergency service, determines that the location measurement system is in an idle state, and pushes an indication to a nearest IP PSAP indicating that an emergency call has been launched and that the location measurement system is in an idle state.

2. The system for tracking users according to claim 1, wherein the indoor location information server is operative to determine a hit geographical area affected by an emergency situation, and to push the indication to the nearest IP PSAP indicating the hit geographical area affected by the emergency situation.

3. The system for tracking users according to claim 2, wherein the processor analyzes stored locations and the corresponding times the measurements were performed for a given registered user to build at least one statistic giving a daily geographical footprint for the given registered user, the daily geographical footprint for the given registered user including at least one location within the closed environment and a corresponding value indicating a probability corresponding to the specific time at that location for the given registered user.

4. The system for tracking users according to claim 1, wherein the processor analyzes stored locations and the corresponding times the measurements were performed for a given registered user to build at least one statistic giving a daily geographical footprint for the given registered user, the daily geographical footprint for the given registered user including at least one location within the closed environment and a corresponding value indicating a probability corresponding to the specific time at that location for the given registered user.

5. A system for tracking users in a closed environment, the system comprising:
   a database for registering the different possible users within the closed environment;
   a location measurement system for locating the users within the closed environment;
   a database for storing the location of the users measured at regular time intervals within the closed environment, wherein the database stores locations of the users within the closed environment versus the time the measurement is performed;
   a processor operative to estimate a possible location of a registered user at any time according to the stored measured locations in the database for a specific time using a statistical analysis corresponding to a daily geographical footprint of the registered user, wherein the processor analyzes stored locations and the corresponding times the measurements were performed for a given registered user to build at least one statistic giving a daily geographical footprint for the given registered user, the daily geographical footprint for the given registered user including at least one location within the closed environment and a corresponding value indicating a probability corresponding to the specific time at that location for the given registered user; and
   a decision unit to provide the possible location of the registered user estimated for a specific time when required in the case the location measurement system is in an idle state;
   wherein the location measurement system includes an indoor location information server operatively coupled with the wireless network infrastructure, and wherein the indoor location information server receives an activated call for emergency service, determines that the location measurement system is in an idle state, and pushes an indication to a nearest IP PSAP indicating that an emergency call has been launched and that the location measurement system is in an idle state.

6. The system for tracking users according to claim 5, wherein the indoor location information server is operative to determine a hit geographical area affected by an emergency situation, and to push the indication to the nearest IP PSAP indicating the hit geographical area affected by the emergency situation.

7. The system for tracking users according to claim 5, wherein the location measurement system comprises a wireless network infrastructure spread over the closed environment, and wherein the database for storing the location of the users is part of an indoor location information server operatively coupled with the wireless network infrastructure.

8. The system for tracking users according to claim 5, wherein in an emergency situation the estimated possible location is forwarded to some Public Safety Answering Point.

9. A method for tracking users in a closed environment comprising:
   registering different possible users within the closed environment;
   measuring at regular time intervals the location of the users within the closed environment using some location measurement system;
   storing the different location measurements of the users with respect to the time of the performed measurement;
   estimating the possible location of the registered users at any time within the closed environment according to the stored measured locations for a specific time using a statistical analysis corresponding to a daily geographical footprint of the registered user by analyzing stored locations and the corresponding times the measurements were performed for a given registered user to build at least one statistic giving a daily geographical footprint for the given registered user, the daily geographical footprint for the given registered user including at least one location within the closed environment and a corresponding value indicating a probability corresponding to the specific time at that location for the given registered user;

providing the possible location of the registered user for a specific time when required in the case the used location measurement system is in an idle state;

receiving an activated call for emergency service;

determining that the location measurement system is in an idle state; and pushing an indication to a nearest IP PSAP indicating that an emergency call has been launched and that the location measurement system is in an idle state.

10. The method according to claim 9, comprising:

determining a hit geographical area affected by an emergency situation;

pushing the indication to the nearest IP PSAP indicating the hit geographical area affected by the emergency situation.

11. A non-transitory computer readable medium comprising: codes to be executed on a terminal for tracking users in a closed environment, wherein some codes when executed estimates the possible location of registered users at any time within the closed environment using a database with stored location measurements of the users performed at regular time intervals within the closed environment using a statistical analysis corresponding to a daily geographical footprint of the registered user, the resulting estimation being forwarded to some application requiring the location of the user, wherein some codes when executed estimate the possible location of the registered users at any time within the closed environment using the measured locations stored in the database for a specific time by analyzing stored locations and corresponding times the measurements were performed for a given registered user to build at least one statistic giving a daily geographical footprint for the given registered user, the daily geographical footprint for the given registered user including at least one location within the closed environment and a corresponding value indicating a probability corresponding to the specific time at that location for the given registered user; further comprising codes when executed to:

receive an activated call for emergency service;

determine that the location measurement system is in an idle state; and push an indication to a nearest IP PSAP indicating that an emergency call has been launched and that the location measurement system is in an idle state.

12. The non-transitory computer readable medium of claim 11, further comprising codes when executed to:

determine a hit geographical area affected by an emergency situation;

push the indication to the nearest IP PSAP indicating the hit geographical area affected by the emergency situation.

* * * * *